United States Patent
Watanabe et al.

(10) Patent No.: US 6,877,031 B2
(45) Date of Patent: Apr. 5, 2005

(54) NETWORK PHOTOGRAPH SERVICE SYSTEM

(75) Inventors: Michito Watanabe, Kanagawa-ken (JP); Makoto Hara, Kanagawa-ken (JP); Takashi Yatabe, Kanagawa-ken (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 0 days.

(21) Appl. No.: 09/246,695

(22) Filed: Feb. 9, 1999

(65) Prior Publication Data

US 2003/0115277 A1 Jun. 19, 2003

(30) Foreign Application Priority Data

Feb. 9, 1998 (JP) ............................................ 10-027180

(51) Int. Cl.⁷ ............................................... G06F 15/16
(52) U.S. Cl. ........................ 709/217; 348/231.2; 705/26
(58) Field of Search ................................ 709/207, 206; 705/26, 27; 355/40, 70; 358/442, 444, 404, 447

(56) References Cited

U.S. PATENT DOCUMENTS

| | | | | |
|---|---|---|---|---|
| 5,605,153 A | * | 2/1997 | Fujioka et al. | 128/653.1 |
| 5,826,241 A | * | 10/1998 | Stein et al. | 705/26 |
| 5,881,233 A | * | 3/1999 | Toyada et al. | 395/200.48 |
| 6,023,345 A | * | 2/2000 | Bloomfield | 358/402 |
| 6,028,982 A | * | 2/2000 | Toyoda et al. | 395/114 |
| 6,073,166 A | * | 6/2000 | Forsen | 709/206 |
| 6,124,939 A | * | 9/2000 | Toyada et al. | 358/1.15 |
| 6,133,985 A | * | 10/2000 | Garfinkle et al. | 355/40 |
| 6,138,149 A | * | 10/2000 | Ohmura | 709/218 |

FOREIGN PATENT DOCUMENTS

EP 0860980 A2 * 11/1997

* cited by examiner

Primary Examiner—Glenton B. Burgess
Assistant Examiner—Kimberly Flynn
(74) Attorney, Agent, or Firm—Birch, Stewart, Kolasch & Birch, LLP

(57) ABSTRACT

An image file is managed by a database of a system of a service provider (center server) on a network. The center server obtains various kinds of information (such as an image ID to specify the image to be transmitted and a destination address) input to the system by a service user who has viewed the disclosed image. Based on this information, the center server reads the specified image file from the database, converts the image file into an attachment document format, generates an image-attached electronic mail message, and transmits the electronic mail message to the specified address.

24 Claims, 8 Drawing Sheets

NETWORK PHOTOGRAPH SERVICE SYSTEM

BACKGROUND OF THE INVENTION

1. Field of the Invention

The present invention relates to a network photograph service system which provides digital photograph services such as a printing service on a network.

2. Description of the Related Art

As a form of a digital photograph service, a network photograph service which stores (registers) a digital image of a user in a service provider system and receives a printing order or the like via a network such as the Internet is known.

In such a service, when a user requests registration of digital images from a laboratory upon requesting film development for example, a registration ID is issued to the user. The photographs recorded on the film are digitized at the laboratory or at a dedicated service center, stored in a system of the service provider, and disclosed on the network. The user can browse through the registered images by accessing the system of the service provider via the network.

Meanwhile, users of electronic mail have been increasing, following the spread of the Internet. Basically, only text can be sent and received as electronic mail via the Internet. Therefore, in order to send and receive binary data such as an image, the binary data need to be converted into text data and a recipient needs to carry out a reverse conversion. As formats defining such conversion, Base64, BinHex, UUENCODE and the like are known. Since this kind of conversion function is incorporated in electronic mail software in many cases, a user without special knowledge of the conversion formats can easily send and receive an image. For this reason, photographs recorded by digital cameras are sent daily, being attached to electronic mail messages.

However, in order to send a photograph recorded by a film camera as electronic mail, the photograph recorded on a film needs to be digitized first so that binary data representing the photograph are obtained. In order to obtain binary data, a user can digitize a photograph by himself/herself by purchasing equipment such as a film scanner. However, as a more convenient method, the user can have an image recorded in a recording medium such as a CD-ROM by such a digital photograph service as described the above. Alternatively, when an image downloading service is provided in a digital photograph service, an image being viewed may be downloaded to a personal computer of the user.

However, it is time-consuming for the user to obtain a recording medium such as a CD-ROM after placing an order for a service to output an image to the recording medium. It is possible to request the service to output images to a recording medium upon requesting image registration. However, in this case, since the image that is desired to be attached to an electronic mail message is not determined at the dine of the request for image registration, all the images end up being recorded, which is costly.

On the other hand, in the method wherein an image is obtained by downloading, only a necessary image can be obtained as required. However, since an image data size is generally large, time and cost (a communication charge) are required when downloading the image to a personal computer. Furthermore, time and cost are also required when the downloaded image is sent to a mail server as an attachment to an electronic mail message.

SUMMARY OF THE INVENTION

Based on consideration of the above problems, an object of the present invention is to provide a network photograph service system which transmits electronic mail with an image being attached thereto so that exchange of photographs via electronic mail can be carried out easily and at low cost.

A first network photograph service system of the present invention provides various kinds of services using an image by disclosing the image on a network, and comprises:

image storing means for storing at least one image;

image selecting means for enabling a service user to select one or a plurality of images from the image or the images stored in the image storing means, by enabling the image or the images in the image storing means to be viewed on the network;

mail generating means for generating an electronic mail message including the image or the images selected by the image selecting means as an attachment to the electronic mail message;

destination address specifying means for enabling the service user to specify a destination address of the electronic mail message; and mail transmitting means for transmitting the electronic mail message to the destination address specified by the destination address specifying means.

The "image storing means" specifically means an image database which stores and manages images received from users. Each image is stored and managed, in a large-capacity hard disc or the like, as an image file having a file name that is determined based on a predetermined rule (for example, a combination of a registration ID and the date of the image registration). The image file can be read from the hard disc based on necessity, for example. The image storing means does not necessarily correspond to a single recording medium, and images may be stored in a distributive manner on a plurality of hard discs of one computer, or on a plurality of hard discs of a plurality of server computers.

The "image selecting means" displays stored images collectively on a screen of a personal computer of a user who has accessed the system via the network, and enables image selection by a number input with a mouse, for example. The input entered by the user is provided to the system as information indicating the selected image.

It is preferable for the images displayed collectively by the image selecting means to be limited to images registered by the user, as in a conventional network system. However, since the present invention is applicable not only to the images registered by a user, but also to images provided by the service provider, a function to restrict viewing by the image selecting means is not necessarily required.

The "mail generating means" converts an image from binary data to text data as an attachment document having predetermined management information, and attaches the document to an electronic mail message.

As has been described above, since the manner of attaching binary data varies depending on the type of personal computer handling the electronic mail, such as Base64 for a Windows computer, and UUENCODE for a UNIX machine, it is preferable for the user to be able to select the attachment mode in advance. In other words, it is preferable for the above network photograph service system to further comprise attachment mode selecting means for enabling the service user to select an attachment mode by presenting a plurality of attachment modes as formats to attach the image so that the mail generating means can carry out the image attachment according to the format selected by the attachment mode selecting means.

The "destination address specifying means" is a function to display an input box on the screen of the personal computer of the user, and to obtain an electronic mail address input by the user. It is preferable for the destination address specifying means to enable one to specify a plurality of destination addresses for a single electronic mail message, so that the same message is simultaneously sent to a plurality of addressees.

The "mail transmitting means" is a function to transmit, to the network, a text file comprising a comment and an image, with information showing a title and the destination address as a mail header.

In order to enable a comment to be transmitted together with an image, it is preferable for the network photograph service system to include comment inputting means for enabling the service user to input a comment on the image selected by the image selecting means so that the mail generating means generates an electronic mail message including the input comment as text.

The "comment inputting means" is a function to display an input box on the screen of the personal computer of the user and to obtain the comment input by the user to the system, for example. A comment may be attached to each image or to a group of images.

An electronic mail message transmitted on the Internet has a mail header which is attached to the mail and indicates a title, a destination address, the sender's address, etc. A mail header is automatically generated by electronic mail software or the like, based on information pre-set by the user or set for each mail. General electronic mail software automatically sets the address of the user of the software as the sender's address.

When general electronic mail software is adopted in the network photograph service system, the mail address of the service provider is set as the sender's address. When a recipient of the mail does not use the address of the sender, this does not cause a problem. However, some electronic mail software automatically generates a reply message by referring to the address of the sender described in the mail message and setting the address as the destination address of the reply mail. Therefore, it is preferable for the service user's mail address to be set as the address of the sender.

In other words, it is preferable for the network photograph service system to include user address setting means which enables the service user to set an electronic mail address of the service user so that the mail transmitting means describes the electronic mail address set by the user address setting means as the address of the sender of the electronic mail message.

A first network photograph service system of the invention sends an image as an electronic mail message. A second network photograph service system of the present invention which will be explained next sends an address of an image rather than the image itself.

In other words, the second network photograph service system of the present invention provides various kinds of services using an image by disclosing the image on a network, and comprises:

image storing means for storing at least one image;

image selecting means for enabling a service user to select one or a plurality of images from the image or the images stored in the image storing means, by enabling the image or the images stored in the image storing means to be viewed on the network;

mail generating means for generating an electronic mail message including an address or addresses of the image or the images selected by the image selecting means;

destination address specifying means for enabling the service user to specify a destination address of the electronic mail message; and mail transmitting means for transmitting the electronic mail message to the destination address specified by the destination address specifying means.

The "image storing means", the "image selecting means", the "destination address specifying means" and the "mail transmitting means" are the same as in the first network photograph service system.

The "mail generating means" describes an address of an image in an electronic mail message. The "address of an image" herein referred to means information needed to specify the location and the file of an image. More specifically, the mail generating means describes the address of an image in the form of a clickable URL (including the name of an image file) of a web page wherein the image is disclosed. By using the clickable URL, when a recipient of the mail clicks on the characters indicating the URL, a browser automatically starts and accesses the URL.

As in the first network photograph service system of the present invention, it is preferable for the second network photograph service system to further comprise comment inputting means for enabling the service user to input a comment on an image selected by the image selecting means so that an electronic mail message including the input comment as text is generated by the mail generating means.

Furthermore, it is preferable for the destination address specifying means to enable specification of a plurality of destination addresses for one electronic mail message.

Moreover, it is preferable for the second network photograph service system to further comprise user address setting means for enabling the service user to set his/her mail address so that the mail transmitting means describes in the electronic mail message, the mail address set by the user address setting means as the address of the sender of the electronic mail message.

The first network photograph service system of the present invention generates and transmits an electronic mail message with an image being attached thereto by storing, managing and disclosing pre-registered user's images on the network and then by receiving, on the network, image selection by the image selecting means and destination address specification by the destination address specifying means. In a conventional system, a user has to input an image to his/her computer or the like by downloading data of the image via a network or via a recording medium. The present invention does not need to obtain an image in such a manner and thus has excellent data transmission efficiency. For a user, cost and time for downloading or outputting to a recording medium are saved, and an image exchange by electronic mail can be carried out more easily.

At this time, if a comment on an image to be transmitted is received on the network and the comment is sent together with the image, the user can attach any comment in the same manner as generating an image-attached electronic mail message.

When a mode of attaching an image can be selected, the image can be attached in a mode appropriate for an addressee. When the attachment mode is changed in accordance with an addressee of an electronic mail message, a user has to have plural kinds of conversion programs (encoders) according to addressees on a conventional system, which is not required by the system of the present invention.

If the address of a sender can be set freely by a user and the mail address set by the user is set as the address of the sender of an electronic mail message to be transmitted, a reply message will be transmitted to the user who has requested the transmission of the original mail, if a recipient of the original mail uses an automatic reply function of the mail software or the like.

Meanwhile, the second network photograph service system of the present invention generates and transmits an electronic mail message as by the first network photograph service system. However, the second network photograph service system sends the address of an image rather than the image itself. Only when a recipient of the mail message tries to obtain the image by accessing the system based on the address of the image, is the image transmitted. Therefore, the data transmission efficiency improves more than in the first network photograph service system.

Like the first network photograph service system, the second network photograph service system can add values by enabling comment attachment or sender's address setting.

Since the first network photograph service system transmits the image itself, a recipient may have a problem with his/her mail box being inundated with images having been sent, when a large number of images are transmitted to the recipient or the mail box is small. However, since the received images can be viewed immediately after opening the electronic mail message, which is convenient for the recipient.

On the other hand, in the case of the second network photograph service system, a recipient needs to access the system based on the image address having been sent, in order to view the image. However, since no image is included, the size of an electronic mail message is small and it does not cause a problem with a mail box as has been described in the above. Moreover, it is more convenient to send an address alone when the decision to view the image is left to a recipient.

DESCRIPTION OF THE PREFERRED EMBODIMENTS

Hereinafter, embodiments of the present invention will be explained with reference to the accompanying drawings. An outline of a network photograph service system will be explained first.

Figure 1:
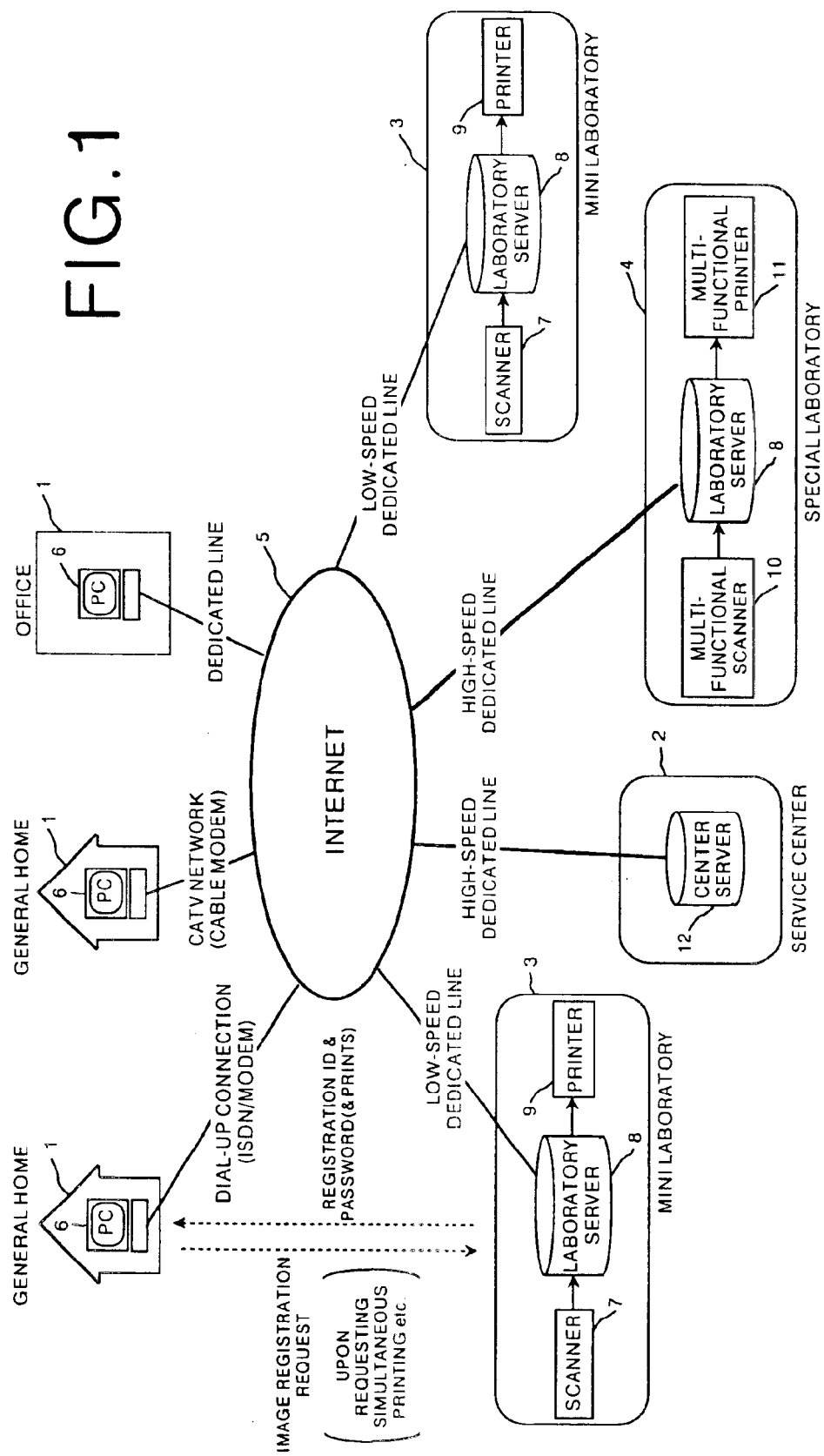
FIG. 1 is an illustration showing an outline of a network photograph service system.

FIG. 1 shows the outline of a network photograph service system as an embodiment of the present invention. As shown in FIG. 1, the system provides a user 1 with a digital photograph service on a network by exchanging via the Internet 5 information between a service center 2 which receives an order for a service and a mini-laboratory 3 which outputs a print or a special laboratory 4 comprising special equipment. At this time, a connection to the Internet may be realized by any known form such as a dedicated line, a dial-up connection, or a CATV network. However, since the service center and the special laboratory have heavy communication loads, a connection by a high-speed dedicated line is preferable. In the explanation below, a server computer installed in the service center 2 is called a center server, and a server computer installed in the mini-laboratory 3 or the special laboratory 4 is called a laboratory server.

Input of image data to the above system is carried out at the mini-laboratory 3. The mini-laboratory usually carries out simultaneous printing wherein a film is developed and the developed film is read by a scanner 7 to generate prints by a printer 9. If registration of images is requested at the time of requesting the simultaneous printing for example, the image data read from the film are registered with a database managed by a laboratory server 8, and a document wherein a registration ID of the images and a registration password are described is provided to the user together with the prints.

Figure 2:
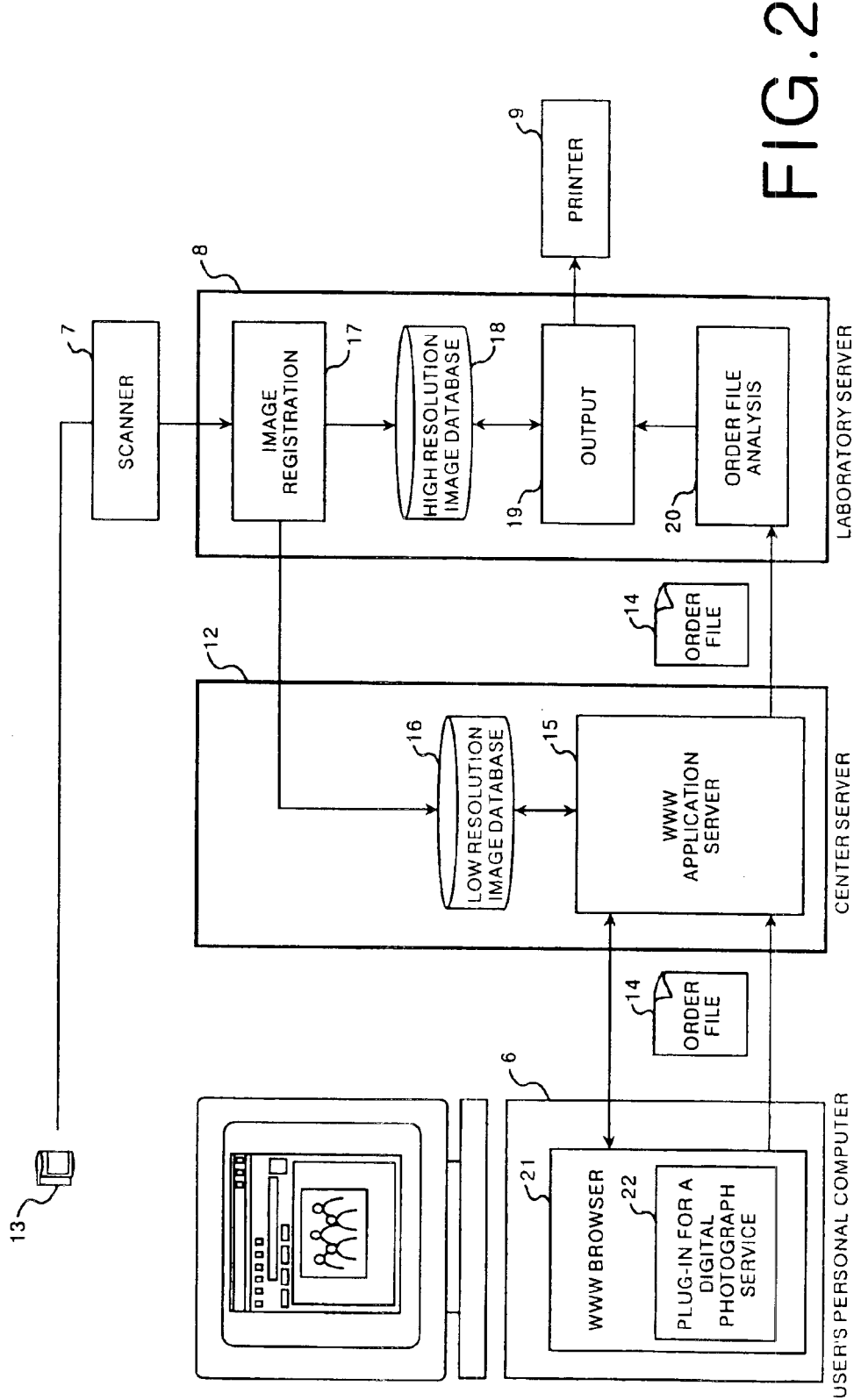
FIG. 2 is an illustration showing a configuration of the network photograph service system.

FIG. 2 shows the system in FIG. 1, with attention being paid to internal configurations of a personal computer 6 of the user 1, a center server 12 at the service center 2, and the laboratory server 8 at the mini-laboratory 3 or the special laboratory 4.

As has been described above, when the user requests the image registration, the image data having been read from a film 13 by the scanner 7 are registered by an image registering function 17 of the laboratory server 8 with a high resolution image database 18 managed by the laboratory server 8. Furthermore, low resolution image data (hereinafter called a thumbnail image) having resolution lower than that of the above image data are generated by the laboratory server 8 and registered by the image registering function 17 with a low resolution image database 16 managed by the center server 12.

In this embodiment, image data to be stored in the high resolution image database have 4 bases of pixels (approximately 1024×1792) which is necessary for printing in an L size at 300 dpi. On the other hand, a thumbnail image for browsing has ¼ of a base of pixels (approximately 368×256).

The center server 12 at the service center 2 provides various kinds of services such as a printing service to the user 1 by disclosing on the network the thumbnail images registered with the low resolution image database 16.

The above-described services are provided in the form of a web page by a WWW application server 15. A program necessary to use such services has been provided to the user 1 in advance. In the example shown in FIG. 2, a plug-in 22 for a digital photograph service is provided to the user. By being incorporated with a browser 21, the plug-in 22 enables browsing, downloading, and ordering printing of the registered images by using the browser 21. The user can browse through the thumbnail images by accessing the web page of the center server 12 after installing the plug-in 22 to the WWW browser 21 such as Netscape Navigator. Furthermore, the user can request various kinds of digital photograph services, such as printing of the image he/she views.

When the user has input order information on the image to be printed, such as the image ID, the quantity and the size of prints, in order to request the printing service, an order file 14 describing the order information in a predetermined data format is generated and transferred to the application server 15 of the center server 12.

The WWW application server 15 finds the laboratory storing the high resolution image data corresponding to the requested image according to the image ID described in the order file, and transfers the order file 14 to the laboratory server 8 at the laboratory having been found. The laboratory server 8 analyzes the content of the order file 14 by using an order file analyzing function 20, reads image data to be printed from the high resolution image database 18, carries out image processing (not shown) such as enlargement or reduction upon necessity on the image data having been read out, and orders printing from the printer 9 by transferring the processed image data.

In the above system, an electronic mail transmission service which is characteristic to the present invention is provided by the WWW application server 15 in the center server 12 in the form of a web page, as the printing service is. The electronic mail transmission service provided by the WWW application server 15 will be explained next.

The WWW application server 15 requests the user who has accessed the system to input a user ID and a user password. One user ID is issued to one user, which is different from the registration ID. The system manages various kinds of information regarding users by the user IDs.

The WWW application server 15 compares the user ID and the user password having been input with a user ID and a user password registered with and managed by a user information database (not shown). When the user ID and the user password input by the user are valid, a main menu is shown on a screen. When the user selects an electronic mail transmission option from the main menu, the electronic mail transmission service which will be explained below is provided.

Figure 3:
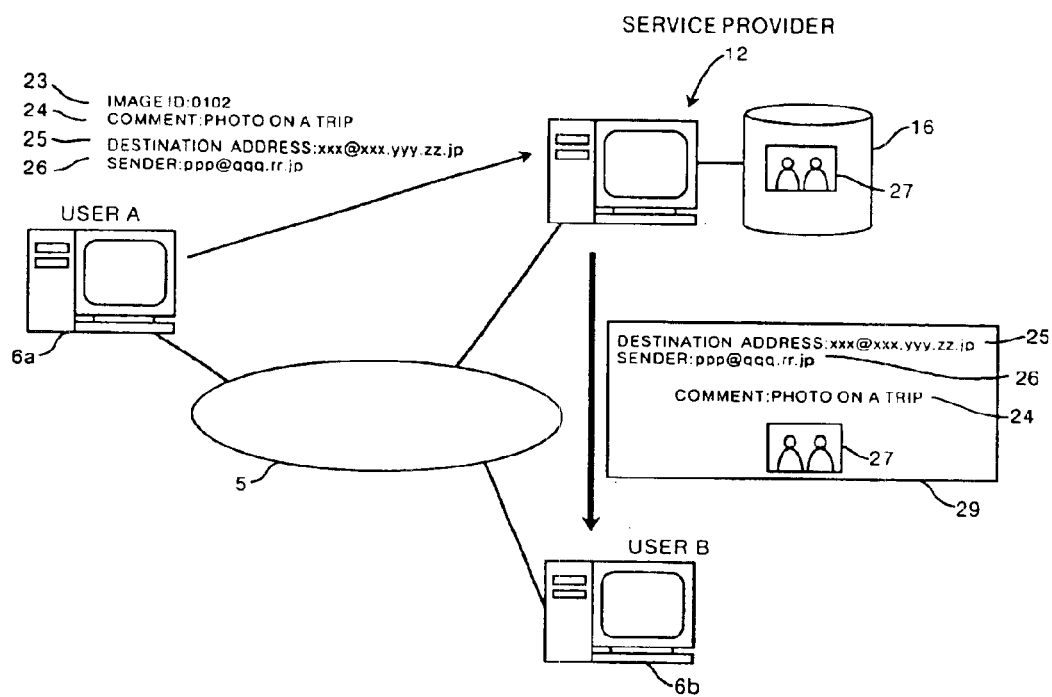
FIG. 3 is an illustration showing a form of an electronic mail transmission service.

FIG. 3 shows a form of the electronic mail transmission service. A user A (using a personal computer 6a) requests the center server 12 to transmit an electronic mail message to a user B (using a personal computer 6b) in this example. As shown in FIG. 3, information such as an ID 23 of an image to be transmitted to the user B, a comment 24, a destination address 25 (a mail address of the user B), and a sender's address 26 (a mail address of the user A) is provided from the user A to the service provider. Based on this information, the center server 12 generates an electronic mail message 29 which has the comment 24 as main text and an image file 27 indicated by the image ID 23 in the low resolution image database 16 as an attachment document. The center server 12 sets the address 26 of the user A as the sender's address and transmits the electronic mail message to the user B at the destination address 25. In this embodiment, the image file 27 is assumed to be a file compressed according to the JPEG format.

Figure 4:
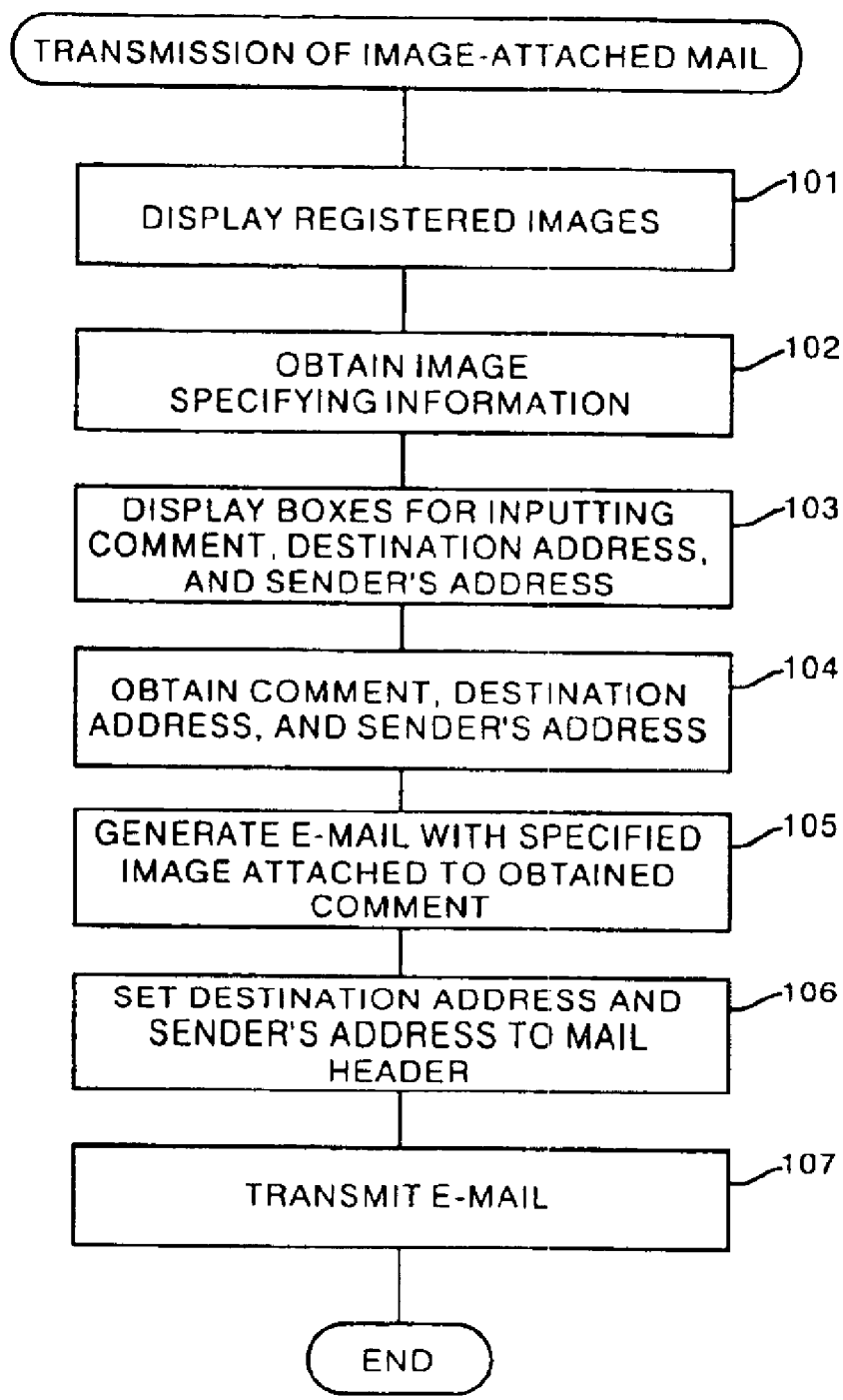
FIG. 4 is a flow-chart showing an example of image-attached mail transmission processing.
Figure 5:
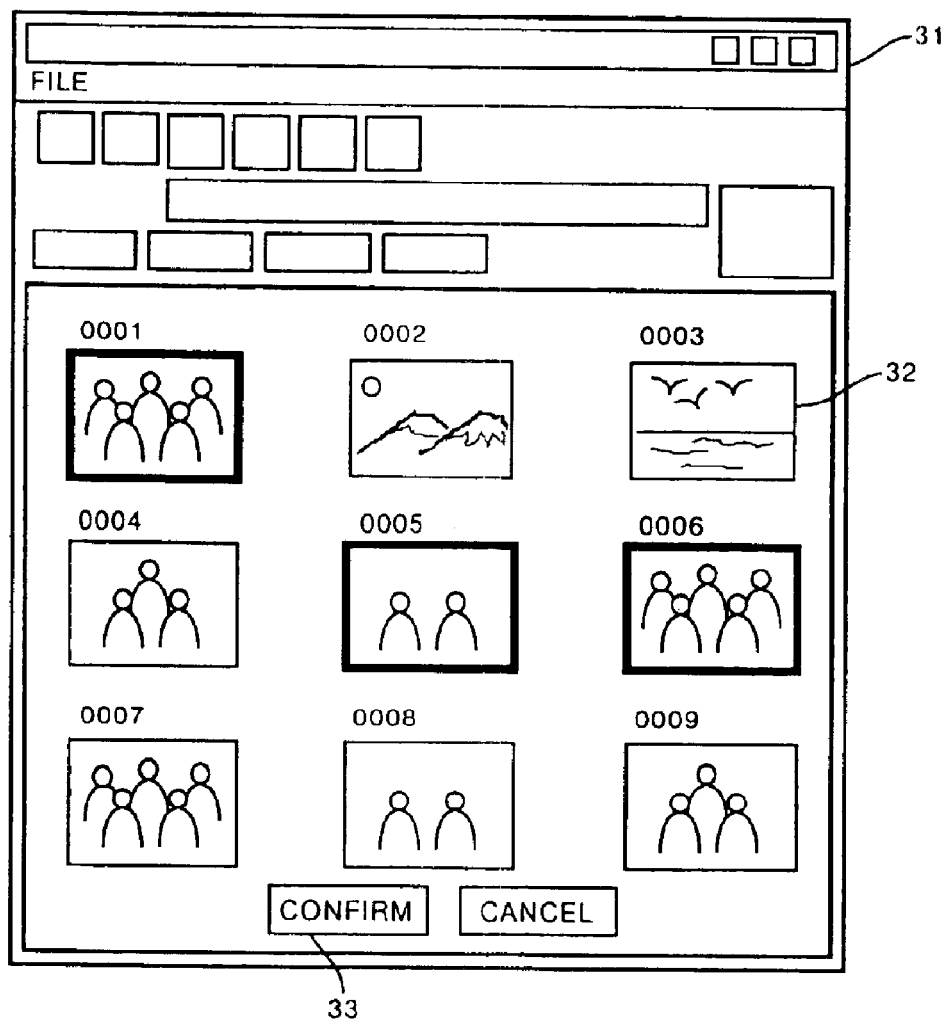
FIG. 5 is an illustration showing an example of a screen whereon images to be transmitted are selected.

FIG. 4 is a flow-chart showing image-attached mail transmission processing carried out by the WWW application server 15. As shown in FIG. 4, the WWW application server 15 first displays images registered by the user who is identified by the user ID (Step 101). A screen 31 shown in FIG. 5 is an example of display at Step 101. The user selects an image to be transmitted from images 32 on the screen by clicking the image using a mouse. In the example shown in FIG. 5, the selected images are distinguished from the rest by being surrounded by thick frames. When the number of the registered images is large and the display needs a plurality of pages, the images are selected by repeating the same procedure on each page. The selected images are confirmed by the user when he/she clicks a confirm button 33.

The WWW application server 15 obtains the IDs of the images having been selected before the confirmation by the confirm button 33 as image specifying information to specify the images to be transmitted (Step 102).

Figure 6:
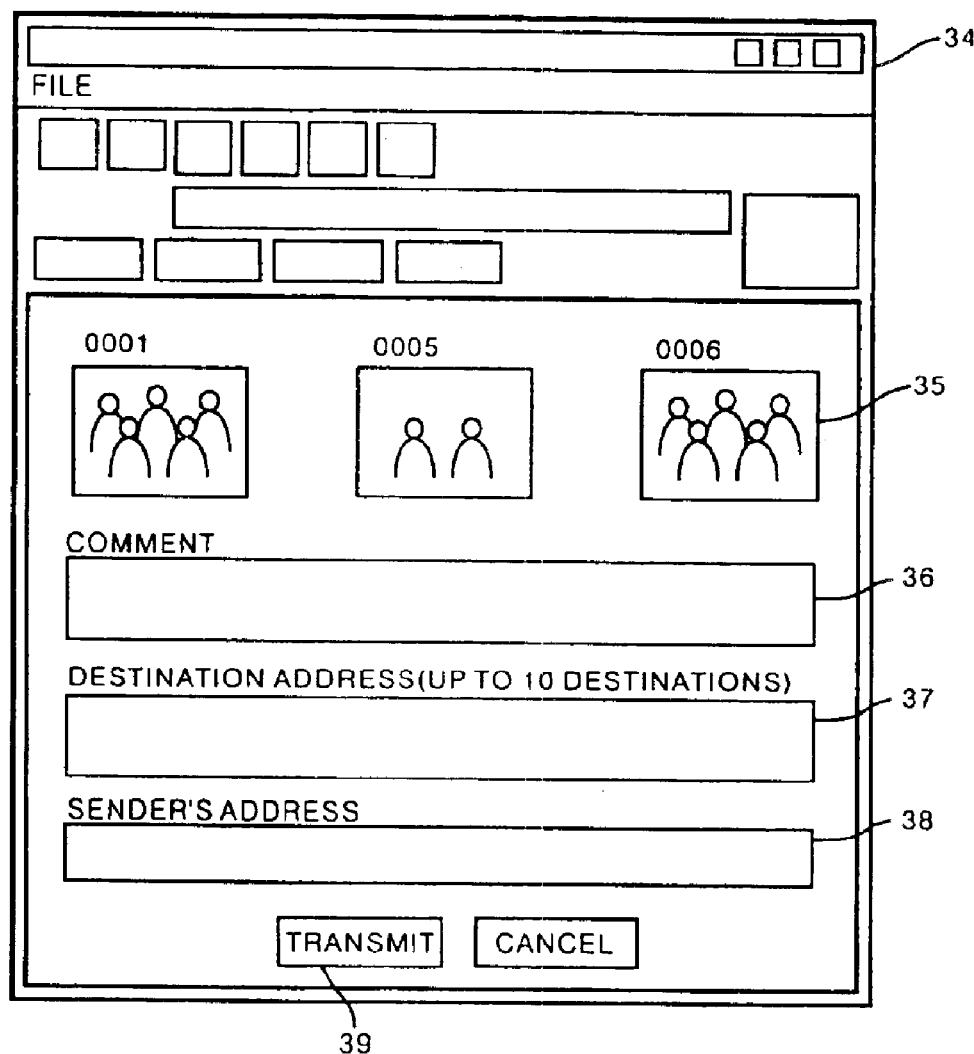
FIG. 6 is an illustration showing an example of a screen whereon various kinds of information is input.

The WWW application server 15 displays boxes for a comment on the selected images, the address of a destination, the address of the sender (the mail address of the user) and the like (Step 103). A screen 34 shown in FIG. 6 is an example of the display at Step 103. In the example shown in FIG. 6, a comment input box 36, a destination address input box 37, a sender's address input box 38, and images 35 having been selected as targets of transmission are shown. The destination address needs to be input, and up-to-10 mail addresses can be input. The comment and the sender's address are not necessarily input. When no sender's address is input, the mail address of the service provider is set as the address of the sender in the mail header.

The information input in these boxes is confirmed by the user when he/she clicks a transmit button 39, and obtained by the WWW application server 15 (Step 104). The WWW application server 15 obtains image files indicated by the image specifying information obtained at Step 102 from the low resolution image database 16, converts the obtained image files from binary to text format. The WWW application server 15 generates an image-attached electronic mail message (Step 105) by attaching the converted image files to the comment obtained at Step 104.

The WWW application server 15 then sets (Step 106) the destination address and the sender's address obtained at Step 104 in the mail header, and transmits the electronic mail message (Step 107).

Figure 7:
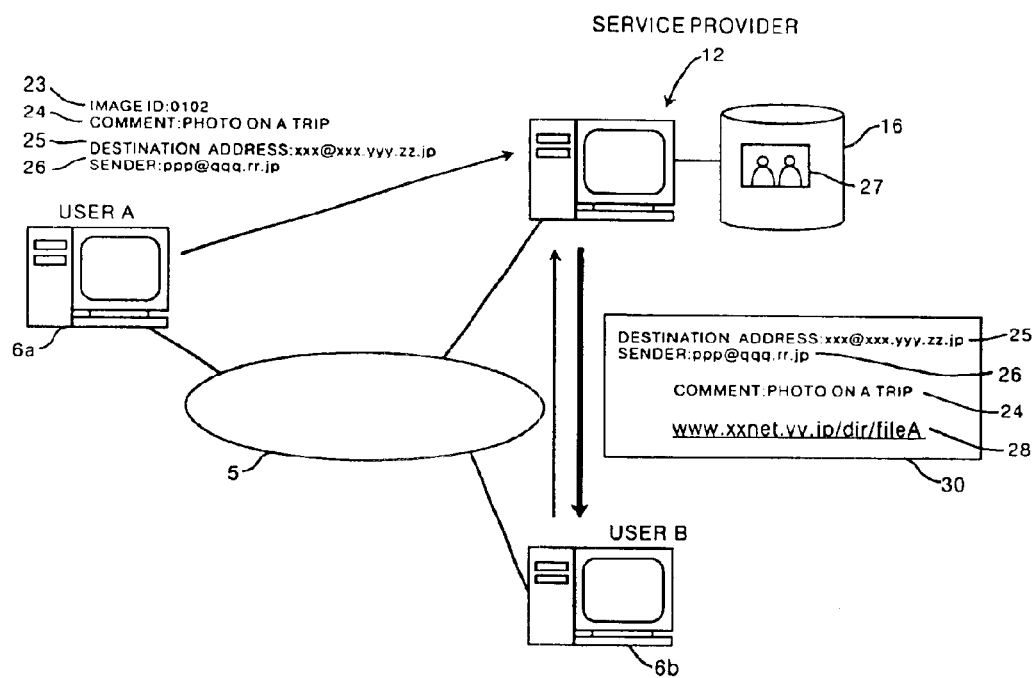
FIG. 7 is an illustration showing an electronic mail transmission service other than the one in FIG. 3.

With respect to the format of an electronic mail transmission service, another format shown in FIG. 7 is also possible. FIG. 7 shows the case where the user A (using the personal computer 6a) requests the center server 12 to send an electronic mail message to the user B (using the personal computer 6b), as in FIG. 3. Information such as the ID 23 of the image to be transmitted to the user B, the comment 24, the destination address 25 (the mail address of the user B), the sender's address (the mail address of the user A) and the like is provided from the user A to the service provider, as in the case shown in FIG. 3.

However, in the format shown in FIG. 7, the image file 27 is not attached to an electronic mail message 30 generated and transmitted by the center server 12, and an address 28 of the image file 27 is described instead of the image file attachment. In other words, the address 26 of the user A is set as the address of the sender of the electronic mail message including the comment 24 and the address 28 of an image, and transmitted to the user B at the destination address 25. Based on the address 28, the user B can access the image file 27 stored in the low resolution image database 16 of the center server 12.

Figure 8:
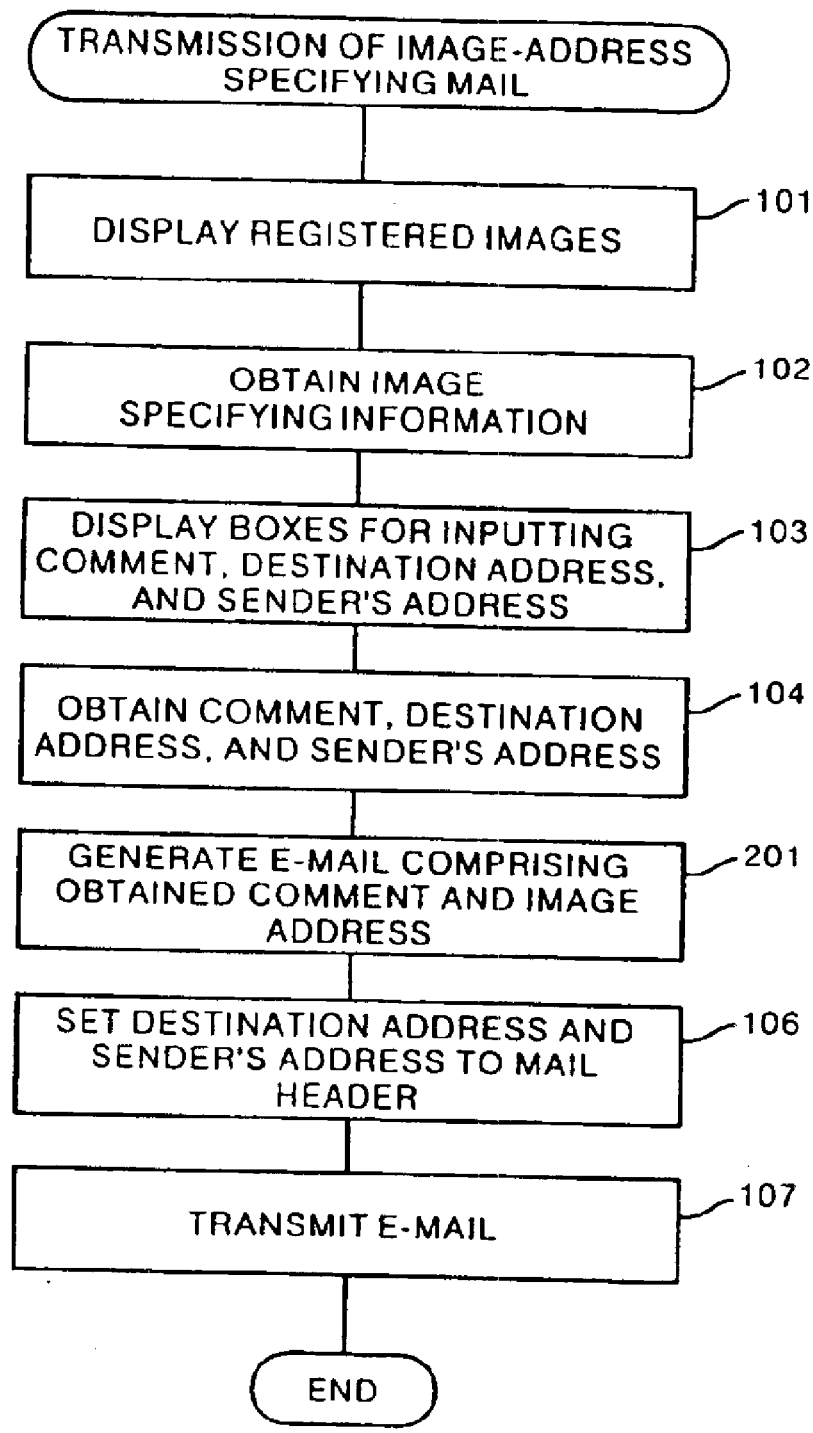
FIG. 8 is a flow-chart showing an example of image-address specifying mail transmission processing.

FIG. 8 is a flow-chart showing an example of the image-address specifying mail transmission processing carried out by the WWW application server 15. Steps 100 through 104, and Steps 106 and 107 are the same as in the image-attached mail transmission processing shown in FIG. 4. Therefore, their explanation is not repeated here. In the format of FIG. 7, the WWW application server 15 generates the electronic mail message (Step 201) describing the image-file address specified by the image specifying information obtained at Step 102 and the comment obtained at Step 104. Since the size of the electronic mail message 30 is comparatively small in the format shown in FIG. 7, a problem such as inundating a recipient's mail box is unlikely to occur.

Two forms of services have been explained in the above. In each embodiment, the user can select an image to be transmitted while viewing registered images on the predetermined screen, and transmit his/her image to another user easily and at low cost, simply by inputting a comment and an electronic mail address.

In the case where an image is sent by electronic mail, in order to secure viewing of the image by a recipient, it is necessary to set the image attachment mode and the image file format in accordance with the system of the recipient. Therefore, the WWW application server 15 may provide a plurality of attachment modes and image file formats as choices so that a user can select from the choices.

In the above embodiments, an image file managed by the low resolution image database 16 of the center server 12 is transmitted. However, an image file managed by the high resolution image database 17 of the laboratory server 8 may be transmitted by an instruction from the center server 12 to the laboratory server 8.

What is claimed is:

1. An application server used in a network photograph service system comprising:

image storing means for storing a plurality of images;

image selecting means for enabling a service user to select at least one of the plurality of stored images, by enabling the stored images to be viewed on a network;

mail generating means for generating an electronic mail message with the selected image as an attachment to the electronic mail message, without requiring a recipient of the electronic mail with attached image to activate an address that points the recipient to a file which stores the selected image;

destination address specifying means for enabling the service user to specify a destination address of the electronic mail message;

user address setting means for enabling the service user to directly set the address of the sender of the electronic mail message, wherein the address of the sender is an automatic reply address; and mail transmitting means for transmitting the electronic mail message to the destination address specified by the destination address specifying means, wherein the mail transmitting means describes the mail address set by the user address setting means as the address of the sender of the electronic mail message.

2. An application server used in a network photograph service system as claimed in claim 1, further comprising comment inputting means for enabling the service user to input a comment on the image selected by the image selecting means, wherein the mail generating means generates an electronic mail message including the input comment as text.

3. An application server used in a network photograph service system as claimed in claim 1, further comprising attachment mode selecting means for enabling the service user to select an attachment mode by presenting a plurality of attachment modes as formats for attaching the image, wherein the mail generating means attaches the image according to the attachment mode selected by the attachment mode selecting means.

4. The application server used in a network photograph service system as claimed in claim 3, further comprising selecting means for selecting between sending the image itself and sending the address of the image.

5. An application server used in a network photograph service system as claimed in claim 1, wherein the destination address specifying means enables specification of a plurality of destination addresses for one electronic mail message.

6. An application server used in a network photograph service system, comprising:

image storing means for storing a plurality of images;

image selecting means for enabling a service user to select at least one of the plurality of stored images, by enabling the stored images to be viewed on a network;

mail generating means for generating an electronic mail message with an address of the selected image;

destination address specifying means for enabling the service user to specify a destination address of the electronic mail message;

user address setting means for enabling the service user to directly set the address of the sender of the electronic mail message, wherein the address of the sender is an automatic reply address; and mail transmitting means for transmitting the electronic mail message to the specified destination address wherein the mail transmitting means describes the mail address set by the user address setting means as the address of the sender of the electronic mail message.

7. A network photograph service system as claimed in claim 6, further comprising comment inputting means for enabling the service user to input a comment on the image selected by the image selecting means, characterized by that the mail generating means generates an electronic mail message including the input comment as text.

8. An application server used in a network photograph service system as claimed in claim 6, wherein the destination address specifying means enables specification of a plurality of destination addresses for one electronic mail message.

9. A network photograph service system, comprising:

image storing means for storing a plurality of images;

image selecting means for enabling a service user to select at least one of the plurality of stored images, by enabling the stored images to be viewed on a network;

mail generating means for generating an electronic mail message with an address of the selected image, wherein a mail address of the application server is set as an address of the sender, and wherein the address of the sender of the electronic mail message is an automatic reply address;

destination address specifying means for enabling the service user to specify a destination address of the electronic mail message;

mail transmitting means for transmitting the electronic mail message to the specified destination address; and user address setting means for enabling the service user directly set the address of the sender of the electronic mail message, wherein the address of the sender is an automatic reply address.

10. A method of sending electronic mail messages with attached images in a network photograph service system, comprising:

displaying a plurality of selectable images to be transmitted to a recipient as an attachment to an electronic mail message, for viewing by the user on a device of the user;

selecting at least one of the plurality of selectable images at the user's device;

displaying the selected at least one image in a manner that distinguishes the at least one image from the rest of the selectable images;

reading an image file corresponding to the selected image from a memory;

converting the read image file into an attachment document format for the electronic mail message;

setting the user's send address for sending the electronic mail message with image attachment, said setting performed by the user, wherein the address of the sender of the electronic mail message is an automatic reply address; and transmitting the electronic mail message with attached image to the recipient, wherein said transmitting step transmits the electronic mail message with image attachment using the set send address of the user.

11. The method of claim 10, further comprising obtaining image identification information of the selected image and destination address information of desired recipient subsequent to said selecting step, said obtaining performed by the center server.

12. The method of claim 10, wherein the recipient receives the electronic mail message with attached image without having to activate an address in the text of the message that points the recipient to a file on the center server that stores the selected image.

13. The method of claim 10, further comprising inputting comment data on the selected image, said inputting performed by the user of the system before said electronic mail message with attached image is transmitted to the recipient.

14. The method of claim 10, further comprising selecting a desired attachment mode from a plurality of selectable attachment modes as formats for attaching the image to the electronic mail message, said selecting performed by the user of the system.

15. The method of claim 14, further comprising selecting between sending the image itself and sending the address of the image.

16. The method of claim 10, further including displaying at the same time a comment box, a destination input box, and images having been selected as targets of transmission.

17. A method of sending electronic mail messages with attached images in a network photograph service system, comprising:

displaying a plurality of selectable images to be transmitted to a recipient as an attachment to an electronic mail message, for viewing by the user on a device of the user;

selecting at least one of the plurality of selectable images at the user's device;

displaying at the same time a comment box, a destination input box, and images having been selected as targets of transmission;

reading an image file corresponding to the selected image from a memory at the server;

converting the read image file into an attachment document format for the electronic mail message;

setting the user's send address for sending the electronic mail message with image attachment, said setting performed by the user, wherein the address of the sender of an electronic mail message is an automatic reply address; and transmitting the electronic mail message with attached image to the recipient, wherein said transmitting step transmits the electronic mail message with image attachment using the set send address of the user.

18. The method of claim 17, further comprising obtaining image identification information of the selected image and destination address information of desired recipient subsequent to said selecting step, said obtaining performed by the center server.

19. The method of claim 17, wherein the recipient receives the electronic mail message with attached image without having to activate an address in the text of the message that points the recipient to a file on the center server that stores the selected image.

20. The method of claim 17, further comprising inputting comment data on the selected image, said inputting performed by the user of the system before said electronic mail message with attached image is transmitted to the recipient.

21. The method of claim 17, further comprising selecting a desired attachment mode from a plurality of selectable attachment modes as formats for attaching the image to the electronic mail message, said selecting performed by the user of the system.

22. The method of claim 21, further comprising selecting between sending the image itself and sending the address of the image.

23. A method of sending electronic mail messages with attached images in a network photograph service system, comprising:

storing a plurality of images;

enabling a service user to select at least one of the plurality of stored images, by enabling the stored images to be viewed on a network;

displaying the selected at least one image in a manner that distinguishes the at least one image from the rest of the selectable images;

generating an electronic mail message with an address of the selected image;

enabling the service user to specify a destination address of the electronic mail message;

providing the address of a sender of the electronic mail message as an automatic reply address;

transmitting the electronic mail message to the specified destination address; and enabling the service user to directly set the address of the sender of the electronic mail message, wherein the address of the sender is an automatic reply address.

24. A method of sending electronic mail messages with attached images in a network photograph service system, comprising:

storing a plurality of images;

enabling a service user to select at least one of the plurality of stored images, by enabling the stored images to be viewed on a network;

displaying at the same time a comment box, a destination input box, and the at least one image having been selected as targets of transmission;

generating an electronic mail message with an address of the selected image;

enabling the service user to specify a destination address of the electronic mail message;

providing the address of a sender of the electronic mail message as an automatic reply address;

transmitting the electronic mail message to the specified destination address; and enabling the service user to directly set the address of the sender of the electronic mail message, wherein the address of the sender is an automatic reply address.

* * * * *